Jan. 9, 1968  D. S. BLISS  3,362,500
AIR CUSHION VEHICLES HAVING FLEXIBLE CUSHION-CONTAINING WALLS
Filed March 15, 1965  6 Sheets-Sheet 1
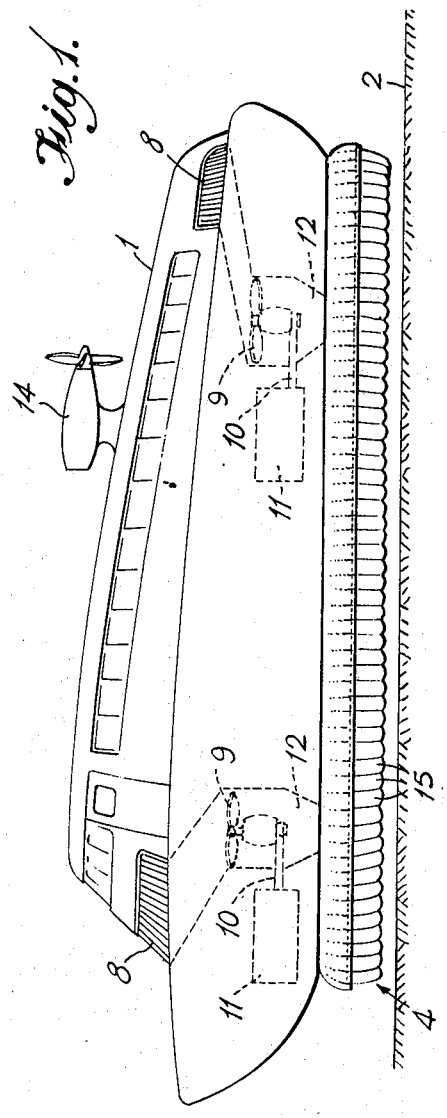
INVENTOR
D. S. BLISS
BY
Cameron, Kerkam & Sutton
ATTORNEYS

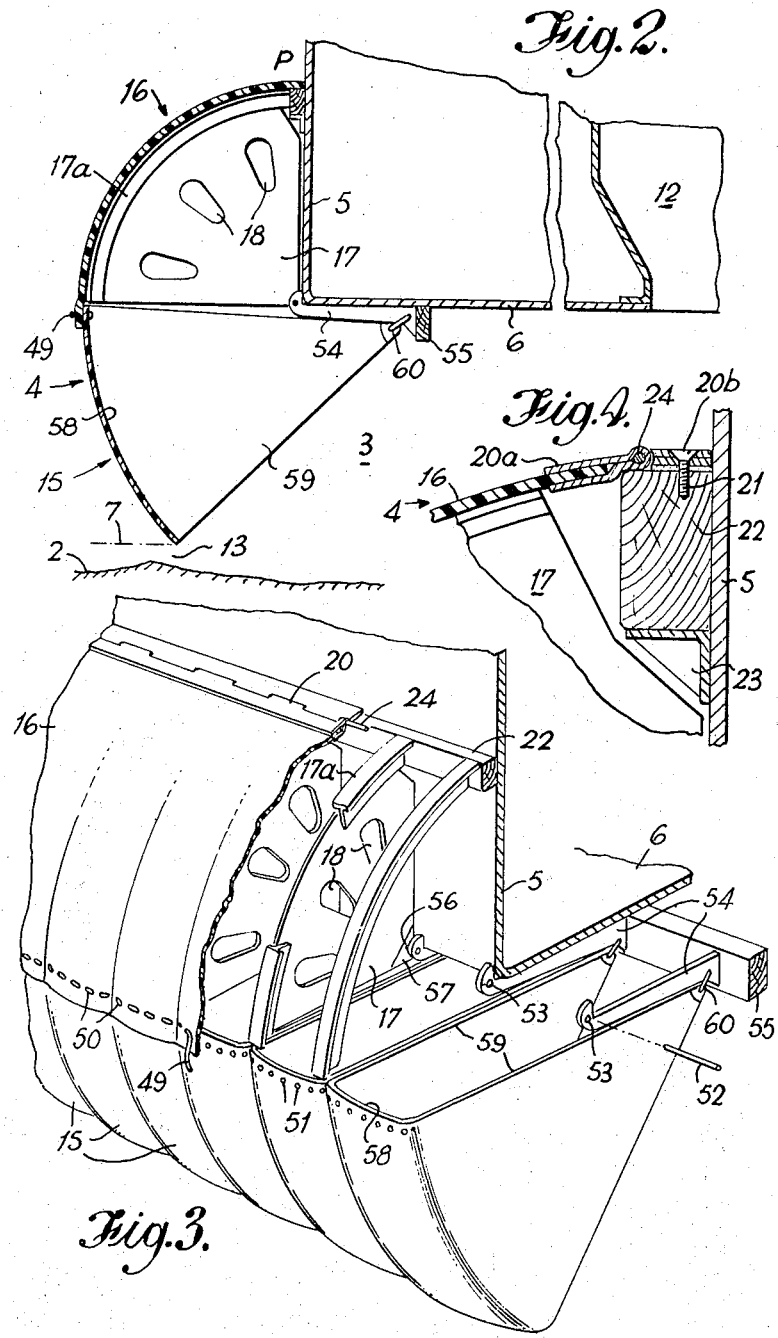

Jan. 9, 1968  D. S. BLISS  3,362,500
AIR CUSHION VEHICLES HAVING FLEXIBLE CUSHION-CONTAINING WALLS
Filed March 15, 1965  6 Sheets-Sheet 3

INVENTOR
D. S. BLISS
BY
Cameron, Kerkam & Sutton
ATTORNEYS

Jan. 9, 1968  D. S. BLISS  3,362,500
AIR CUSHION VEHICLES HAVING FLEXIBLE CUSHION-CONTAINING WALLS
Filed March 15, 1965  6 Sheets-Sheet 4
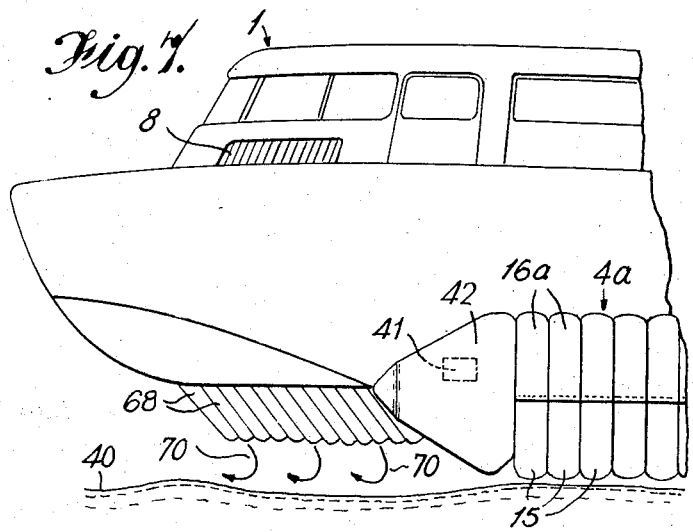
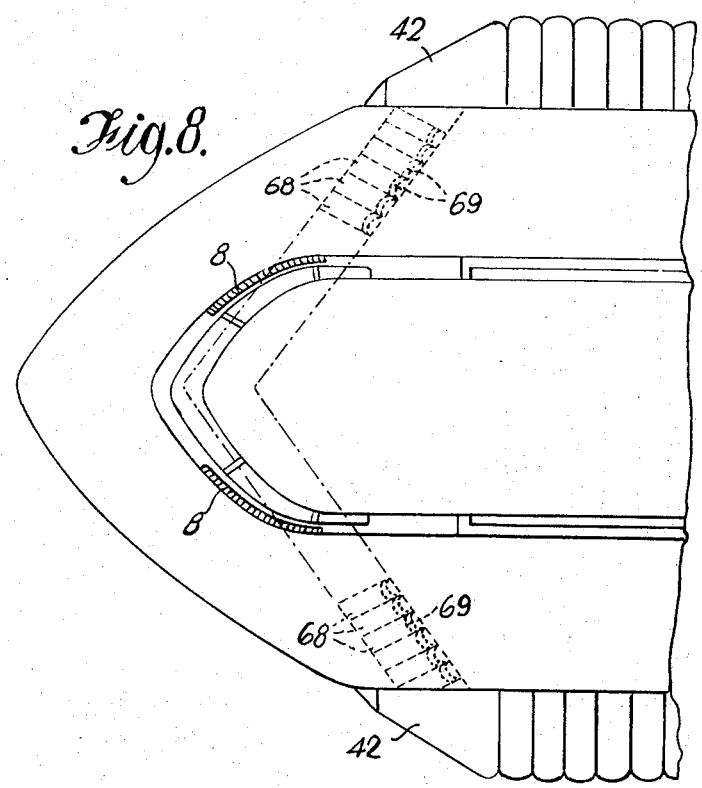
INVENTOR
D. S. BLISS
BY
Cameron, Kerkam & Sutton
ATTORNEYS INVENTOR
D. S. BLISS
BY
Cameron, Kerkam & Sutton
ATTORNEYS

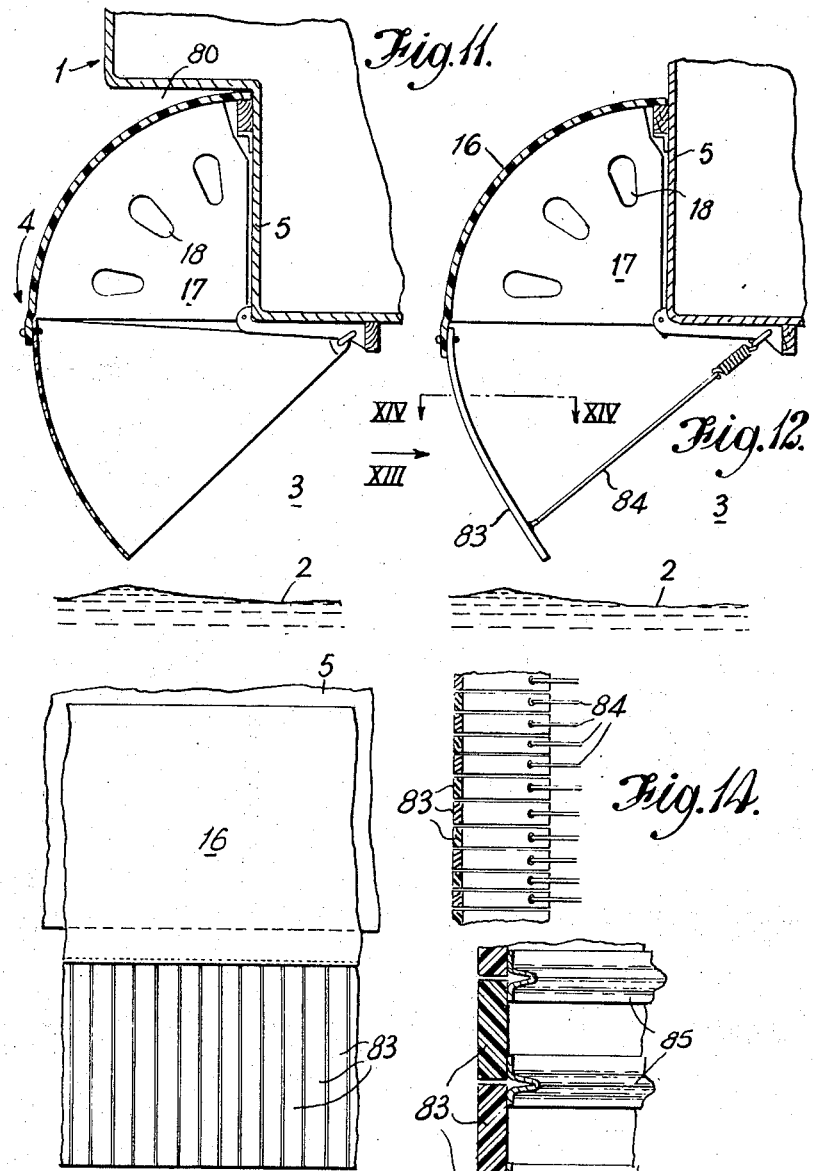

United States Patent Office 3,362,500
Patented Jan. 9, 1968

3,362,500
AIR CUSHION VEHICLES HAVING FLEXIBLE CUSHION-CONTAINING WALLS
Denys Stanley Bliss, Ashurst, Southampton, England, assignor to Hovercraft Development Limited, London, England, a British company
Filed Mar. 15, 1965, Ser. No. 439,651
Claims priority, application Great Britain, Mar. 17, 1964, 11,257/64
26 Claims. (Cl. 180—128)

This invention relates to vehicles for travelling over a surface and which, in operation, are supported above that surface at least in part by a cushion of pressurised gas formed and contained beneath the vehicle body. The invention is particularly related to vehicles wherein at least part of the periphery of the cushion is contained by a flexible wall extending downwardly from the vehicle body of by the combination of such as a well and a curtain of moving fluid.

The upper end of a flexible wall has hitherto been attached to the lower periphery of the vehicle body. The wall can extend vertically downward or it can incline inwards towards the cushion. The inward inclination arrangement is the superior as it enables loads on the wall to be substantially tensile, thus allowing the use of thin, light, sheet materials for their construction.

Providing a vehicle with an inwardly inclining flexible wall creates a problem as the vehicle is deprived of a considerable area of the cushion. The cushion area of which it is deprived can be retrieved, however, by providing support structure of stub-like form, attached to and projecting horizontal from the lower periphery of the vehicle body, and by attaching the upper edge of a flexible wall to the outer extremity of the support structure.

This apparent solution to the problem creates, however, in turn, another problem as forces applied by the cushion pressure will give rise to substantial upward loading of the horizontally disposed support structure. Hence the support structure has to be provided with sufficient strength to resist this loading and this in turn results in a substantial increase in the weight of the vehicle.

Increasing the weight of the vehicle demands (for the same cushion pressure) a larger cushion area and to provide a larger cushion area the projecting width of the support structure has to be increased. Increase in the support structure width demands in turn an increase in strength, and, with its accompanying penalty of weight, a counter-demand for yet a further increase in support structure width and so on.

According to the invention, a vehicle for travelling over a surface and which, in operation, is supported above that surafce at least in part by a cushion of pressurised gas formed and contained beneath the vehicle body, has at least part of the periphery of the cushion contained by a wall having a profile extending outwardly and downwardly from a side portion of the vehicle body and thereafter inclining inward toward the space occupied by the cushion to terminate at a level below that of the bottom surface of the vehicle body, at least a lower portion of the wall being formed by a plurality of flexible, discrete wall members, deflectable relative to each other.

The discrete wall members forming at least the lower portion of the wall may conveniently be of the kind disclosed by co-pending application Ser. No. 267,695, filed Mar. 25, 1963, now abandoned, and the continuation-in-part thereof, Ser. No. 566,948, filed July 21, 1966, that is, they may each comprise a sheet of flexible material folded to form an outer portion, the inner surface of which faces towards the space bounded by the wall (the cushion space) and two side or tie portions extending inwardly from said outer portion into said space.

Two embodiments of the invention will now be described by way of example with reference to the accompanying drawings wherein:

FIGURE 1 is a side view of the vehicle, according to one embodiment,

FIGURE 2 is an enlarged section on the lines II—II of FIGURE 1,

Figure 5:
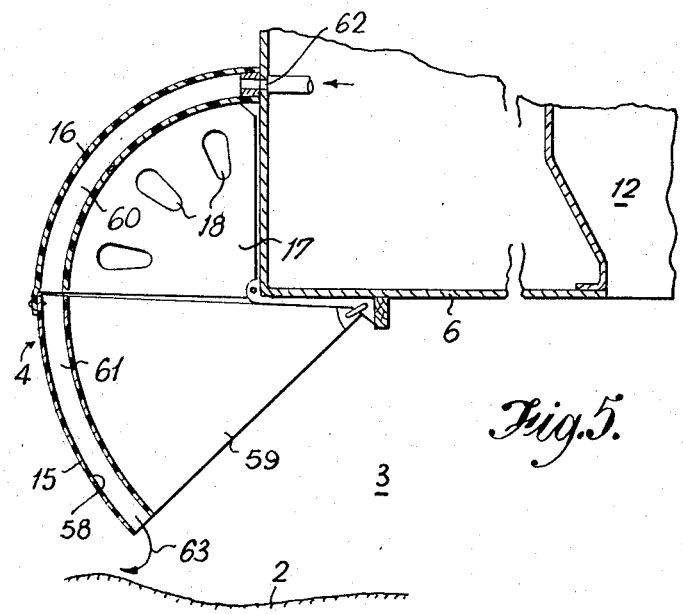
Figure 6:
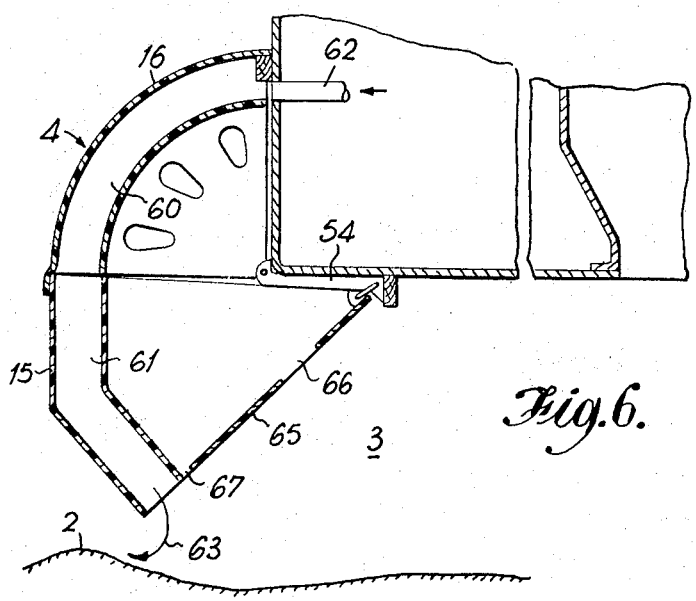
Figure 9:
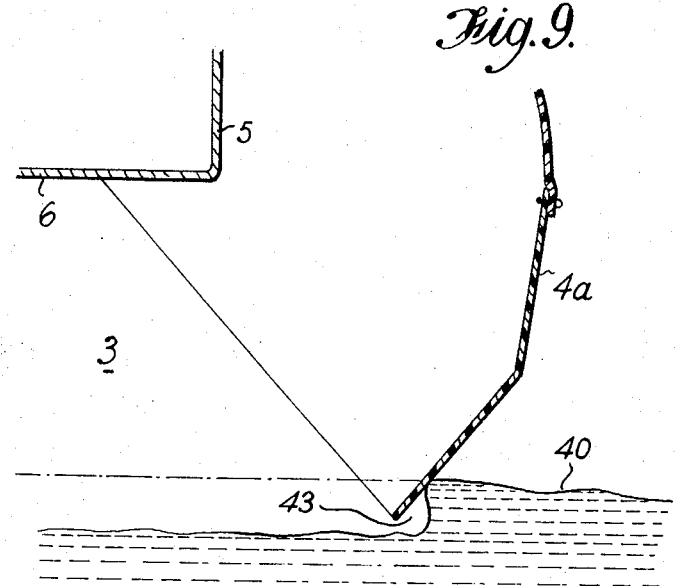
Figure 10:
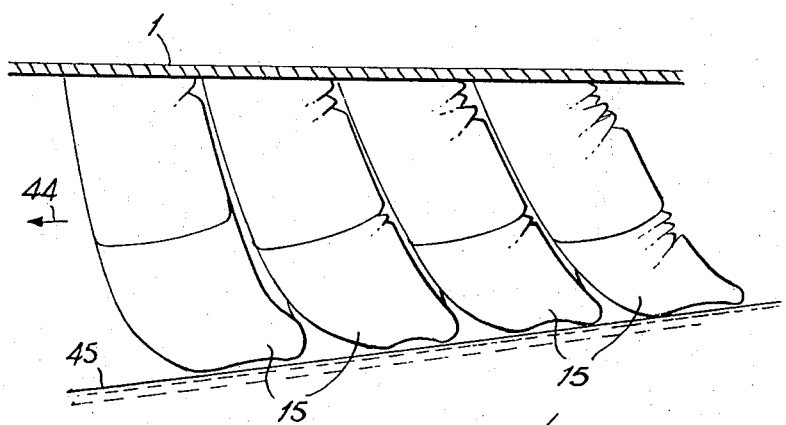

FIGURE 3 is a perspective view, with some parts removed, of the flexible wall fitted to the vehicle of FIGURE 1, FIGURE 4 is an enlarged detal of part of FIGURE 2 and part of FIGURE 3, FIGURES 5 and 6 are modifications of the structure shown in FIGURE 2, FIGURES 7 and 8 are fragmentary side and plan views of the vehicle of FIGURE 1, with modifications, FIGURES 9 and 10 illustrate diagrammatically the behaviour of a flexible wall when the vehicle is operating over water, FIGURE 11 is a view similar to that of FIGURE 2 and illustrates a further modification, FIGURES 12 and 13 are end section and side views respectively and illustrate a further embodiment of the invention, FIGURE 14 is a section on the lines XIV—XIV of FIGURE 12, and FIGURE 15 is an enlarged detail, similar to that of FIGURE 14, and illustrates a modification thereof.

Referring to FIGURES 1 and 2, a vehicle 1 travelling a land surface 2 is supported by a cushion 3 (FIGURE 2 only) of pressurised air formed and contained beneath the body of the vehicle 1, the sides of its cushion 3 being contained by a downwardly extending flexible wall 4 having a cushion-bounding profile which extends outwardly and downwardly from a side portion of the vehicle body 5 and from a first point P above the bottom surface 6 thereof, thereafter inclining inward towards the space occupied by the cushion 3 and towards the surface 2 to terminate at a second point outboard of the first point on a level 7 below that of the bottom surface 6. The lower portion of the wall 4 is formed by a plurality of flexible, discrete wall members 15 deflectable relative to each other.

In further detail, the vehicle 1 is of the so-called plenum chamber type, the cushion 3 being formed by atmospheric air drawn through intakes 8 by propellers 9 driven through shafts 10 by motors 11 and fed under pressure, through ducts 12, to below the bottom surface 6 of the vehicle body. Once the cushion 3 is formed, the vehicle 1 is supported with the flexible wall 4 in the position shown in FIGURE 2, i.e. with a small gap 13 (shown exaggerated) below the bottom of the wall 4, through which excess air escapes to atmosphere. The vehicle is propelled over the surface 2 by an air screw propeller unit 14.

The flexible wall 4 is constructed from sheets of thin rubberised fabric and comprises, with the lower wall members 15, an upper wall member 16 of strip form prevented from being blown outwards (by the cushion 3) by gusset or web parts 17 attached to the wall member 16 by T-section strips 17a. The gusset parts 17 have communication ports 18 which allow air to pass freely between the spaces defined by the gussets 17. The gussets 17 and strips 17a are of rubberised fabric also. Adjacent edges of the wall members 15, 16 overlap slightly and are demountably attached to each other by laces 49 threaded through co-operating slots 50, 51 in the wall members 15, 16.

Referring now to FIGURES 3 and 4 also, the upper edge of the upper wall member 16 is demountably attached to the side wall of the vehicle body 5 by a movable joint 20. The joint 20 is of two part construction, having a hinge member 20a fixed to the upper edge of the wall member 16 and a cooperating hinge member 20b secured by screws 21 to longitudinal strips 22 carried on brackets 23 secured to the side walls of the vehicle body. The hinge members are of rubber strip, edges of which are cut to form castellations and the "crests" of the castellations turned back to form loops through which a withdrawable hinge pin or rod 24 extends to interconnect the hinge members 20a, 20b in the manner shown.

The lower, inner corners of the gussets 17 are demountably attached to the side walls of the vehicle body by a rod 52 extending through holes 53 in the outboard ends of brackets 54 mounted on strips 55 attached to the bottom surface 6 of the vehicle body and through co-operating holes 56 in the lower, inner corners of the gussets 17. The holes 56 are reinforced by metal plates 57 attached to the gussets 17. To allow replacement of a wall member 15 the rods 24, 52 and tape 49 are withdrawn. The arrangement allows rapid replacement and interchangeability of a wall member 15 which can suffer damage by abrasive contact with the surface 2.

The flexible, discrete, bottom wall members 15 are, in this example, of the kind disclosed by the above-mentioned applications Ser. Nos. 267,695 and 566,948, each comprising a sheet of rubberised material folded to form an outer portion 58, the inner surface of which faces towards the space bounded by the wall 4 (i.e. the space occupied by the cushion 3) and two side or tie portions 59 extending inwardly in substantially parallel array from the outer portion 58 into said space. The inner, upper corners of the tie portions 59 are demountably attached to the brackets 54 by link and pin arrangements 60. The tie portions 59 of adjacent wall members 15 are held in face-to-face air-sealing contact by cushion pressure.

The wall members 15 can readily deflect relative to each other, so as to allow passage of the vehicle over irregular surfaces. If the wall 4 is brought into contact with an irregularity, only one or more of the wall members 15 need deflect to allow passage of the vehicle over the irregularity. If a wall member 15 is ripped away from the vehicle body, the neighbouring wall members 15 close up to seal, or at least reduce, the gap which would otherwise result.

By providing the vehicle 1 with a flexible wall having a profile according to the invention, the original cushion area of the vehicle (i.e., the plan area of the vehicle body) is not only retained, but, as indicated in FIGURE 2, can even be substantially increased. Furthermore, as the profile of the wall 4 dictates that the outer portions 58 of the wall members 15 incline inwards, towards the cushion 3, the material of the wall members is subjected only to tensile loads. This allows the use of very thin material with the accompanying advantages of low weight and high flexibility.

As will readily be apparent, the flexible wall of the invention can also be used in combination with fluid curtains. To achieve this, upper and lower parts 15, 16 of the flexible wall 4 are provided, as shown in FIGURE 5, with panels of flexible material defining an internal nozzle 60, 61. Pressurised air tapped from ducts 12 is fed through ducts 62 in the side walls of the vehicle body 5 to issue from the bottoms of the nozzles 61 in the form of curtains 63 of moving air, flowing towards the surface 2 to complete containment of the cushion 3.

In the modification illustrated in FIGURE 6 the lower wall members 15 are constructed so as to have an angular rather than a curved profile. A wall member with an angular profile is easier to construct than one with a smooth curve, being of two-dimensional rather than three-dimensional form. The "angular" wall member is also easier to construct as it is made with rather less seams than a "curved" wall member. FIGURE 6 also shows how any tendency for a wall member 15 to "scoop" up foreign matter such as debris or water, can be avoided, or at least substantially reduced, by fitting panels 65 of flexible material between the tie portions 59 of each wall member 15. The panels 65 have air ports 66 which allow communication with the cushion 3 and also have drain holes 67. The modified wall member also has curtain-forming nozzles 60, 61 and nozzle air supply ducts 62.

In the modification illustrated in FIGURES 7 and 8, in which the vehicle 1 is shown travelling over a water surface 40, the sides of the cushion 3 are contained by a flexible wall 4a, similar in all respects to the above-described wall 4 except that the upper wall member 16 of the latter has been replaced by a plurality of individual wall members 16a, each of which is identical to a wall member 15, but disposed in an "inverted" position relative thereto. This modification provides a wall comprising a plurality of wall parts, each part being formed by an interconnected pair of wall members 15, 16a. The arrangement provides a more flexible wall structure, as an individual wall part (i.e. a pair of interconnected wall members 15, 16a) can deflect relative to a neighbouring wall part. Cushion pressure holds the adjacent side faces of the wall parts in air sealing contact. The arrangement allows an even more rapid replacement of damaged parts of a flexible wall.

The front and rear ends of the cushion 3 are contained in part by rows of flexible wall members 68 of form similar to the flexible wall members 15. The wall members 68 are formed with nozzles 69 and air tapped from the ducts 12 (FIGURE 1) is fed to the nozzles to issue as curtains 70 to complete containment of the cushion ends. The modification takes the vehicle 1 out of the pure plenum-chamber classification. Alternatively, the rear row of flexible wall members 68 may be replaced by an inflatable wall of the kind disclosed by Patent No. 3,291,237, i.e. an inflatable wall member constructed from sheets of rubberised fabric so as to have a profile, when inflated, which has a vertical cross-section extending from a first edge initially in a direction outwardly from the cushion space and thereafter extending downwardly and then inwardly and then upwardly in a substantially continuous curve ending in a second edge so as to present on its lower surface a convex face presented towards the surface over which the vehicle travels.

Bag-like inflatable members 42 of generally conical form, made from sheets of flexible material, are disposed at both fore and aft ends of the flexible wall 4a so as to "blend in" or "bridge" the walls 4a and the flexible members 68. The fore-disposed members 42 also serve to deflect water away from adjacent parts of the flexible wall 4a, which might otherwise collapse the front wall members 15, 16a. The rear members 42 also serve to restrict rearward movement of the pairs of wall members 15, 16a when the vehicle is at speed over water with the wall members touching the water. The interiors of the members 42 are supplied with air through ports 41 (FIGURE 7) connected to the ducts 12 (FIGURE 1). End faces of the members 42 adjacent the ends of the flexible wall 4a have air communication ports (not shown) which align with similar ports formed in the side portions of each wall member 16a.

FIGURE 9 illustrates, diagrammatically, how the surface 40 of the water is distorted by pressure of the cushion 3 and shows that an air pocket 43 is formed between the bottom of the flexible wall 4a and the water surface 40, the air pocket reducing contact between the wall 4a and the water so that little drag results.

FIGURE 10 illustrates, diagrammatically, a view from the interior of the space occupied by the cushion 3, and shows how the flexible wall members 15 deflect individually as the vehicle 1 passes, in the direction of the arrow 44, over a wave 45.

FIGURE 11 illustrates a further modification wherein a flexible wall 4 (or wall 4a) is housed partly within a recess 80 in the lower side portion of the vehicle body 5. This arrangement results in only a slight outward projection of a wall from the sides of a vehicle body.

FIGURES 12 to 14 illustrate yet another modification of a wall 4 (or 4a), wherein flexible wall members 15 are replaced by rows of discrete flexible strips 83 in parallel array, disposed side-by-side with their longitudinal axes extending in a substantially vertical direction. The upper ends of the strips 83 are laced (or otherwise suitably attached) to the bottom edge of the flexible wall member 16, leaving the lower ends thereof free to deflect relative to each other. If the strips 83 are too flexible to keep their inward inclination against cushion pressure, their lower ends can be constrained by elastic ties 84 attached to the vehicle body 5. The strips 83 may be made of any suitable flexible material, for example, hard rubber or plastic. With reference to FIGURE 15, to prevent the escape of cushion air when there is a relative deflection between adjacent members 83, flexible seals 85 can be provided, attached to, and so interconnecting in a flexible manner, adjacent members 83. The seals 85 comprise flexible members of U-like lateral cross-section disposed lengthwise along adjacent edges of pairs of strips, one limb of a seal 85 being attached to an edge part of one strip 83 and the other limb of a seal 85 being attached to an edge part of the adjacent strip 83.

When vehicles constructed according to the invention are operating over water and come alongside a deck to take on or discharge passengers and/or cargo the flexible members nearest the dock side serve as fenders to reduce impact forces on the vehicle body. Thereafter, the flexible members can be deflated by cutting off the supply of air to the cushion space, so that the vehicle then floats on the water.

It will be apparent that the invention is not limited to vehicles newly constructed according to its teachings, but that existing vehicles can be so modified with little difficulty.

We claim:

1. A vehicle for travelling over a surface and which, in operation, is supported above that surface at least in part by a cushion of pressurised gas formed and contained beneath the vehicle body, comprising a wall containing at least part of the periphery of the cushion, said wall having upper and lower portions and a boundary surface having a profile extending outwardly and downwardly from a first point on one side of the vehicle body, thereafter inclining inwardly towards the space occupied by the cushion and towards the surface beneath the vehicle to terminate at a second point below the bottom surface of the vehicle body and outboard of the first point, at least the lower portion of the wall being formed by a plurality of flexible, discrete wall members, deflectable relative to each other, and a plurality of tie means extending between said boundary surface and the vehicle body in spaced-apart planes disposed substantially normal to the cushion periphery, each tie means providing constraint against outward deflection by internal pressure over substantially the whole of the vertical cross-section of the wall.

2. A vehicle as claimed in claim 1 wherein at least the upper portion of the wall is constructed from flexible sheet material inflatable to conform to the desired profile of said upper portion of the wall.

3. A vehicle as claimed in claim 1 wherein substantially the whole of the wall is constructed from flexible sheet material inflatable to conform to said profile.

4. A vehicle as claimed in claim 1 wherein said lower portion of the wall is demountably attached to the upper portion of the wall.

5. A vehicle as claimed in claim 1 wherein each wall member forming the lower portion of the wall comprises an outer, cushion-facing portion constrained to resist outward deflection by cushion pressure and two side portions extending inwardly from said outer portion into the space bounded by the wall.

6. A vehicle as claimed in claim 5 wherein said side portions constitute the tie means constraining the outer portion from outward deflection.

7. A vehicle as claimed in claim 5 including means for supplying a pressurised fluid to the interior of the upper portion of the wall, at least one of the wall members comprising the lower portion of the wall being formed so as to cause the fluid to issue from the bottom of said one wall member and form a curtain of moving fluid.

8. A vehicle as claimed in claim 7 wherein said one wall member is provided with flexible wall means spaced inboard from and defining with its outer portion a nozzle for conducting pressurised fluid along the inner surface of said outer portion.

9. A vehicle as claimed in claim 5 wherein at least one of the wall members comprising the lower portion of the wall includes a panel of flexible material extending between the inner edges of the wall member side portions so as to restrict entry of foreign matter into the space between said side portions.

10. A vehicle as claimed in claim 1 wherein the upper part of the wall comprises a plurality of inflatable wall members, each wall member comprising an outer, cushion-facing portion constrained to resist outward deflection by internal pressure and two side portions extending inwardly from said outer portion into the space bounded by the wall.

11. A vehicle as claimed in claim 10 wherein said side portions constitute the means constraining the outer portion from outward deflection.

12. A vehicle as claimed in claim 1 including means for demountably attaching the upper portion of the wall to the vehicle body.

13. A vehicle as claimed in claim 12 wherein said demountable attaching means includes a movable joint comprising a pair of cooperating hinge members one of which is attached to the wall and the other of which is attached to the vehicle body, and a hinge pin interconnecting the hinge members, said hinge pin being withdrawable from the hinge members so as to allow separation thereof.

14. A vehicle as claimed in claim 1 including means disposed at the rearward end of the wall for restricting rearward movement of the wall members.

15. A vehicle as claimed in claim 14 wherein said means comprises an inflatable bag constructed from flexible sheet material and attached to the vehicle body.

16. A vehicle as claimed in claim 1 for operation over water including means disposed at the forward end of the wall for shielding the forward parts of the wall from waves.

17. A vehicle as claimed in claim 16 wherein said means comprises an inflatable bag constructed from flexible sheet material and attached to the vehicle body.

18. A vehicle for travelling over a surface and which, in operation, is supported above that surface at least in part by a cushion of pressurised gas formed and contained beneath the vehicle body wherein the sides of the cushion are contained, at least in part, by a pair of parallel disposed walls, each wall being as claimed in claim 1.

19. A vehicle as claimed in claim 18 including a plurality of wall members containing, at least in part, the fore end of the cushion, each wall member comprising an outer cushion-facing portion constrained to resist outward deflection by cushion pressure and two side portions extending inwardly from said outer portion into the space bounded by the wall.

20. A vehicle as claimed in claim 19 wherein said side portions constitute the means constraining the outer portion from outward deflection.

21. A vehicle as claimed in claim 18 including a plurality of wall members containing, at least in part, the aft end of the cushion, each wall member comprising an outer cushion-facing portion constrained to resist outward deflection by cushion pressure and two side portions extending inwardly from said outer portion into the space bounded by the wall.

22. A vehicle as claimed in claim 21 wherein said side portions constitute the means constraining the outer portion from outward deflection.

23. A vehicle for travelling over a surface and which, in operation, is supported above that surface at least in part by a cushion of pressurised gas formed and contained beneath the vehicle body, comprising a wall containing at least part of the periphery of the cushion, said wall having upper and lower portions and a boundary surface having a profile extending outwardly and downwardly from a first point on one side of the vehicle body, thereafter inclining inwardly towards the space occupied by the cushion and towards the surface beneath the vehicle to terminate at a second point below the bottom surface of the vehicle body and outboard of the first point, at least the lower portion of the wall being formed by a plurality of flexible, discrete wall members, deflectable relative to each other, adjacent parts of the upper and lower portions of the wall being overlapped, lacing threaded through said overlapping parts for demountably attaching the lower portion of the wall to the upper portion thereof, and a plurality of tie means extending between said boundary surface and the vehicle body in spaced-apart planes disposed substantially normal to the cushion periphery, each tie means providing constraint against outward deflection by internal pressure over substantially the whole of the vertical cross section of the wall.

24. A vehicle for travelling over a surface and which, in operation, is supported above that surface at least in part by a cushion of pressurised gas formed and contained in a space beneath the vehicle body, comprising a wall containing at least part of the periphery of the cushion, said wall having upper and lower portions and a boundary surface having a profile extending outwardly and downwardly from a first point on one side of the vehicle body, thereafter inclining inwardly towards the cushion space and towards the surface beneath the vehicle to terminate at a second point below the bottom surface of the vehicle body and outboard of the first point, the lower portion of the wall being formed by a plurality of flexible, discrete wall members, deflectable relative to each other, each of said wall members being substantially U-shaped in horizontal cross section having an outer portion forming part of said boundary surface and two substantially parallel side portions extending inwardly from the outer portion into the cushion space, the space between said side portions being in direct communication with the cushion space, and a plurality of tie means, including said side portions of the wall members, extending between said boundary surface and the vehicle body in spaced-apart planes disposed substantially normal to the cushion periphery and providing constraint against outward deflection by the cushion pressure over substantially the whole of the vertical cross section of the wall.

25. A vehicle as claimed in claim 24 wherein the upper portion of the wall is constructed from flexible sheet material inflatable to conform to the desired profile of said upper portion of the wall.

26. A vehicle as claimed in claim 24 wherein substantially the whole of the wall is constructed from flexible sheet material inflatable to conform to said profile.

References Cited
UNITED STATES PATENTS

| | | | |
|---|---|---|---|
| 3,244,248 | 4/1966 | Prickett | 180—7 |
| 3,260,323 | 7/1966 | Henry | 180—7 |
| 3,272,271 | 9/1966 | Cockerell | 180—7 |

FOREIGN PATENTS

| | | |
|---|---|---|
| 245,422 | 6/1963 | Australia. |
| 740,316 | 8/1966 | Canada. |
| 1,368,600 | 6/1964 | France. |
| 1,377,636 | 9/1964 | France. |
| 938,913 | 10/1963 | Great Britain. |
| 964,611 | 7/1964 | Great Britain. |

A. HARRY LEVY, *Primary Examiner.*

BENJAMIN HERSH, *Examiner.*

N. SALES, *Assistant Examiner.*